(12) United States Patent
Rumsey

(10) Patent No.: US 6,231,951 B1
(45) Date of Patent: May 15, 2001

(54) FOAM STRUCTURE AND METHOD OF PRINTING THEREON

(76) Inventor: Ian Rumsey, 17 Dumas Cul-de-Sac, Brackley, Northants NN13 6LL (GB)

(*) Notice: Subject to any disclaimer, the term of this patent is extended or adjusted under 35 U.S.C. 154(b) by 0 days.

(21) Appl. No.: 09/029,105

(22) PCT Filed: Jun. 19, 1997

(86) PCT No.: PCT/GB97/01658

§ 371 Date: May 8, 1998

§ 102(e) Date: May 8, 1998

(87) PCT Pub. No.: WO97/48559

PCT Pub. Date: Dec. 24, 1997

(30) Foreign Application Priority Data

Jun. 20, 1996 (GB) .................................................. 9612981

(51) Int. Cl.[7] .............................. B32B 27/14; B32B 3/00
(52) U.S. Cl. ...................... 428/195; 428/304.4; 428/480; 428/500
(58) Field of Search ................................. 428/195, 314.4, 428/474.9, 500, 518, 542.4, 158, 159, 304.4, 480

(56) References Cited

U.S. PATENT DOCUMENTS

| | | | |
|---|---|---|---|
| 3,971,315 | * | 7/1976 | Hansen ................................. 101/333 |
| 4,046,936 | | 9/1977 | Schachter ............................ 428/195 |
| 4,103,634 | * | 8/1978 | Schachter ............................ 112/439 |
| 4,281,040 | * | 7/1981 | Santiago ............................... 428/195 |
| 4,407,882 | | 10/1983 | Hauser et al. ....................... 428/159 |
| 4,427,731 | * | 1/1984 | Gibson ................................. 428/159 |
| 4,806,412 | * | 2/1989 | Wank et al. ......................... 428/203 |
| 5,106,417 | * | 4/1992 | Hauser et al. ........................ 106/20 |
| 5,169,435 | * | 12/1992 | Sherman et al. ....................... 106/20 |
| 5,531,944 | * | 7/1996 | Frisch .................................... 264/52 |
| 5,548,003 | * | 8/1996 | Reman et al. ....................... 523/106 |

FOREIGN PATENT DOCUMENTS

| | | |
|---|---|---|
| 13245/70 | 10/1970 | (AU) . |
| 1081606 | 8/1967 | (GB) . |
| 1216153 | 12/1970 | (GB) . |
| 1459345 | 12/1976 | (GB) . |
| 2 124 516 | 2/1984 | (GB) . |
| 2 216 463 | 11/1989 | (GB) . |
| 2 251 209 | 1/1992 | (GB) . |

OTHER PUBLICATIONS

Printing Ink Manual, F.A. Askew, H.Heffer & Sons Ltd. Cambridge, 1969, pp. 584–601.

* cited by examiner

*Primary Examiner*—Bruce H. Hess
*Assistant Examiner*—B. Shewareged
(74) *Attorney, Agent, or Firm*—Brinks Hofer Gilson & Lione

(57) ABSTRACT

A printed foam structure comprising a layer of foamed polyolefin plastic and a layer of textile ink in direct contact with the foamed plastic. The textile ink is preferably a plastisol based ink which preferably comprises a vinyl resin such as polyvinyl chloride, polyvinyl acetate, or a combination of the two as a co-polymer.

7 Claims, No Drawings

FOAM STRUCTURE AND METHOD OF PRINTING THEREON

The invention relates to printed foam structures and methods of printing onto foam. In particular, the foams are polyolefin type foams which have widespread use for example in children's toys, sports equipment and camping accessories.

In order to provide a printed design on top of a layer of polyolefin foam, it is known first to coat the foam with a material such as polyester to which certain types of inks are able to bond. The requirement of an intermediate bonding layer or coat leads to additional cost and attempts to print directly onto foam has lead to an unsatisfactory quality of the printed image. This is because of the difficulty in rendering the printed image stable and the printed image being inflexible, subject to cracking, having a low rub resistance. Additionally the result is not waterproof and unable to be moulded.

An object of the invention is to overcome the problems of the prior art and to provide better quality printed images on polyolefin foams. Accordingly, one aspect of the invention provides a printed foam structure comprising a layer of foamed polyolefin plastic and a layer of textile ink in direct contact with the foamed polyolefin plastic. A textile ink is one which is suitable for printing on to cotton and other textiles including nylon. For example, the textile ink can be plastisol based and comprise a vinyl resin such as polyvinyl chloride, polyvinyl acetate, or vinyl acetate/vinyl chloride co-polymer, or a mixture of these. Preferably, the plastisol based ink comprises a plasticizer such as phthalate.

The textile ink can be one which is suitable for printing onto polyamides such as nylon and such inks are generally polyester based. The ink can be urethane based, or comprise poly(ethylene terephthalate) or indeed 2-PET.

Preferably the foamed plastic is a polyolefin foam such as physically or chemically cross-linked polyolefin incorporating polyethelene and polyethelene containing ethyl vinyl acetate.

Another aspect of the invention provides a method of creating a printed foam structure, comprising the step of bringing a textile ink into direct contact with a layer of foamed plastic.

Embodiments of the invention will now be described by way of example only.

In a first example, a heat curable plastisol ink is used to create a full colour design on a 30 kg m$^{-3}$ density expanded cross link polyethelene foam. The plastisol ink is an Easiprint trichromatic set available from Sericol Limited of Broadstairs, Kent. The image is printed using a four colour screen-printing technique. A 120 T screen mesh is used and each colour was printed wet on wet and then heat cured. An infrared dryer was used at a temperature of 150° C. for approximately 30 seconds. Example 1 provides a well defined full colour image which is waterproof, non toxic, rub resistant and flexible.

By way of a second example, an air drying nylon ink known as "Sericol Nylobag" available from Sericol of Broadstairs, Kent, is used to create a single colour image on a 167 kg m$^{-3}$ density polyethelene ethyl vinyl acetate co-polymer foam such as made by Copex or O.K. Company of Gava, Barcelona, Spain. Again the image was screen printed on to the foam using a 43 T screen mesh and the ink was allowed to dry overnight in the ambient atmosphere. Again, the result was a well defined single colour image which was waterproof, non toxic, rub-resistant and flexible.

Beneficially the foam and printed image are mouldable together.

Nylobag ink is a polyester based ink system. A suitable ink can comprise polyurethane and also a curing catalyst such as isocyanate.

In a third example a 60 kg m$^{-3}$ density plastic foam made by Sentinel Products Corporation of Hyannis, Mass. was printed on using a single colour image. A suitable ink is a plastisol phosphorescent ink such as Sericol Texopaque OP. The ink was printed through a 55 T mesh and then heat cured at 185° C. for forty seconds.

In a fourth example, a 60 kg m$^{-3}$ density foam made by Alveo and a plastisol trichomatic set plastic made by Gibbon Marler Limited of Wimbledon London is used. Accordingly, a full colour image can be created on the foam using a four colour printing process. In this example a 90 T mesh and was used for screen printing wet on wet. The ink was then cured using a infrared dryer at a temperature of 180° C. for approximately forty seconds.

In a fifth example, a 167 kg m$^{-3}$ density foam made by Copex was printed in full colour using Sericol Easiprint Trichomatic set as described above. Again the colours were printed in a four colour screen printing process and the ink was then cured by placing the printed foam structure in an oven at a temperature of 150° C. for one minute. The foam was then transferred to a press moulding machine and moulded for approximately 50 seconds. For example, a three dimensional hand puppet can be created by printing a flat caricature image of a famous actor or cartoon character for example on a flat foam surface and then pressing the foam in a mould to a desired three dimensional shape.

Accordingly, the invention relates in particular to polyolefin foam such as physically or chemically cross-linked polyolefin incorporating polyethelene and polyethelene containing ethyl vinyl acetate, and to textile ink. Textile inks are capable of being printed onto textiles such as cotton and nylon in a reasonably permanent manner, e.g. usually colourfast over successive washes. Such textile inks include plastisol based inks comprising vinyl resins and nylon inks being polyester based.

Printed foamed structure according to the invention can comprise a well defined and full colour image on the foam which is waterproof, non-toxic, rub-resistant and flexible. Moreover the foam and image can be moulded for example using known press moulding machinery. In moulding, it is preferably to use plastisol inks. When using low density foam, air drying plastisol inks are preferred. Low density foam is foam generally less than 40 kg/m$^3$ and more particularly for densities less than 70 kg/m$^3$.

What is claimed is:

1. A printed foam structure comprising a layer of foamed polyolefin plastic having directly applied thereto a design constituted by a textile ink comprising a plastisol or a polyester resin, wherein the polyolefin is a low alkene based plastic, wherein the number of carbons is less than 4 and wherein the printed foamed plastic comprises polyethylene and ethyl vinyl acetate copolymer.

2. A printed foam structure comprising a layer of foamed polyolefin plastic having directly applied thereto a design constituted by a plastisol based textile ink comprising a plastisol or polyester resin wherein the plastisol comprises a plasticizer containing phthalate.

3. A printed foam structure according to claim 2 wherein the plastisol based textile ink comprises polyvinyl chloride.

4. A printed foam structure according to claim 2 wherein the polyester resin comprises polyvinyl acetate.

5. A printed foam structure comprising a layer of foamed polyolefin plastic having directly thereto a design constituted by a plastisol based textile ink comprising a plastisol or a polyester resin wherein the plastisol is the largest component of the textile ink by weight or volume.

6. A printed foam structure according to claim 5 wherein the plastisol based textile ink comprises polyvinyl chloride.

7. A printed foam structure according to claim 5 wherein the polyester resin comprises a vinyl acetate/vinyl chloride co-polymer.

* * * * *